US008587518B2

(12) United States Patent
Davies

(10) Patent No.: US 8,587,518 B2
(45) Date of Patent: Nov. 19, 2013

(54) DISPARITY CURSORS FOR MEASUREMENT OF 3D IMAGES

(75) Inventor: Robert G. Davies, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 272 days.

(21) Appl. No.: 13/088,125

(22) Filed: Apr. 15, 2011

(65) Prior Publication Data
US 2012/0162067 A1 Jun. 28, 2012

Related U.S. Application Data

(60) Provisional application No. 61/426,894, filed on Dec. 23, 2010.

(51) Int. Cl.
G09G 5/08 (2006.01)

(52) U.S. Cl.
USPC ............................................. 345/157; 345/24

(58) Field of Classification Search
USPC ............... 345/23, 24, 156, 157; 715/856–861
See application file for complete search history.

(56) References Cited

U.S. PATENT DOCUMENTS

| 3,943,344 | A | * | 3/1976 | Kidode et al. | 702/166 |
| 4,808,979 | A |   | 2/1989 | DeHoff et al. | |
| 6,225,979 | B1 | * | 5/2001 | Taima et al. | 345/157 |
| 8,026,950 | B2 | * | 9/2011 | Hill et al. | 348/218.1 |
| 2012/0235996 | A1 | * | 9/2012 | Zhang | 345/419 |

FOREIGN PATENT DOCUMENTS

EP 0285315 A2 10/1988

OTHER PUBLICATIONS

Hoff W et al., "Surfaces from Stereo: Integrating Feature Matching, Disparity Estimation, and Contour Detection," IEEE Transactions on Pattern Analysis and Machine Intelligence, IEEE Service Center, Los Almitos, CA, vol. 11, No. 2, Feb. 1, 1989 pp. 121-136.
EP Search Report for European Patent Application No. 11189353.3 dated Aug. 24, 2012, 6 pages.

* cited by examiner

Primary Examiner — Regina Liang
(74) Attorney, Agent, or Firm — Michael A. Nelson; Marger Johnson & McCollom PC

(57) ABSTRACT

A test and measurement instrument according to an embodiment of the present invention provides a disparity cursor for making quick and easy disparity measurements. In operation, a user uses a sample cursor to specify a pixel of a first image and uses the disparity cursor to specify a pixel of a second image. The test and measurement instrument then automatically provides a measured disparity value based on the two pixels.

14 Claims, 2 Drawing Sheets

DISPARITY CURSORS FOR MEASUREMENT OF 3D IMAGES

CROSS-REFERENCE TO RELATED APPLICATIONS

This application claims the benefit of U.S. Provisional Patent Application No. 61/426,894 titled "DISPARITY CURSORS FOR MEASUREMENT OF 3D IMAGES" filed on Dec. 23, 2010.

FIELD OF THE INVENTION

The present invention relates to video test and measurement instruments, and more particularly to disparity measurements for three dimensional (3D) images.

BACKGROUND OF THE INVENTION

In the production of 3D movies, disparity is the horizontal separation of the corresponding pixels of the left-eye view and the right-eye view of an object. The amount and polarity of disparity determines the depth of the object in the 3D plane, which causes the object to appear either close or far away relative to the normal image plane. If the disparity is negative, i.e., if the right-eye image is to the left of the left-eye image, then the disparate object appears closer than the normal image plane. If the disparity is positive, i.e., if the right-eye image is to the right of the left-eye image, then the disparate object appears farther away or behind the normal image plane. Too much disparity can cause headaches or even make viewers ill. Too little disparity can reduce the 3D effect. Disparity measurements are necessary for 3D video production and can be used in camera setup, production, post-production, quality assurance, etc. Measurements in video post-production are becoming more important as computer generated graphics are combined with live material where determining the disparity is critical to merge these two technologies together.

Disparity is conventionally measured using various approaches. In one approach, a user enlarges the picture and measures the object differences with a ruler. While this approach is simple, it is also crude and prone to inaccuracies. A more elegant approach is to use a video waveform monitor. In this approach, the user manually moves a sample cursor for a first measurement, manually moves the sample cursor for a second measurement, calculates the difference between the two measurements, and then divides the result by the video format width in pixels to obtain the disparity in pixels relative to the video horizontal resolution width. This approach is more accurate, however it is time consuming, and it requires that the user have explicit details of the video format.

What is desired is a quicker and easier way to make disparity measurements.

SUMMARY OF THE INVENTION

A test and measurement instrument according to an embodiment of the present invention provides a disparity cursor for making quick and easy disparity measurements. In operation, a user uses a sample cursor to specify a pixel of a first image and uses the disparity cursor to specify a pixel of a second image. The test and measurement instrument then automatically provides a measured disparity value based on the two pixels.

The objects, advantages, and other novel features of the present invention are apparent from the following detailed description when read in conjunction with the appended claims and attached drawings.

DETAILED DESCRIPTION OF THE INVENTION

Figure 1:
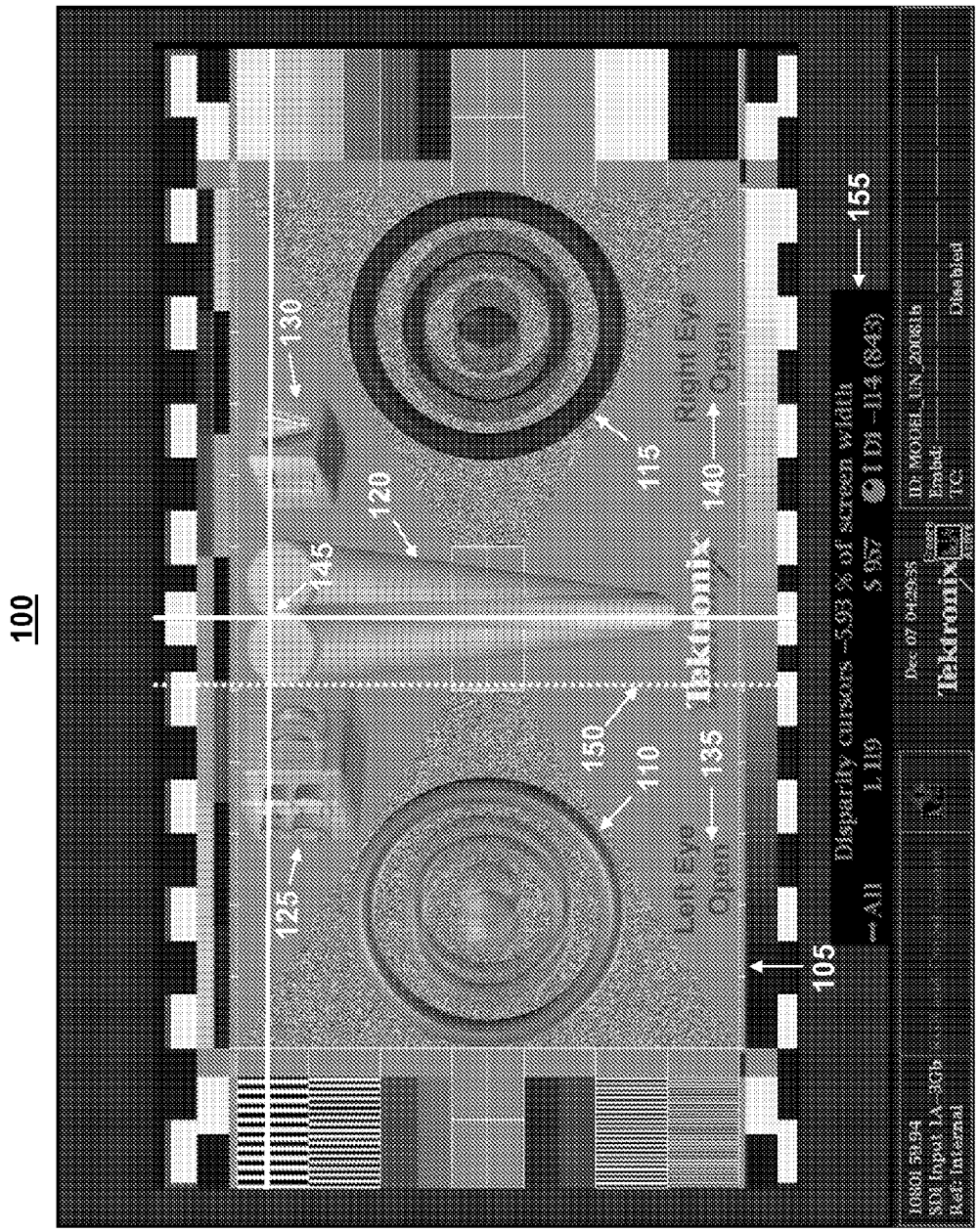
FIG. 1 depicts a display of a video waveform monitor according to a first embodiment of the present invention.

FIG. 1 depicts a display 100 of a video waveform monitor such as a WFM8000 Waveform Monitor available from Tektronix, Inc. of Beaverton, Oreg. The display 100 depicts an image under test, a conventional sample cursor 145, and a disparity cursor 150 according to an embodiment of the present invention, all of which are described in more detail below.

The image under test is a conventional test image that is commonly used for 3D testing. It is a composite image which consists of two separate 1080i images, a left-eye image and a right-eye image, each 1920×1080 active pixel picture area, which are superimposed into a single image. Both the left-eye and right-eye images contain some common elements in which the data is exactly the same. These common elements are located around the edge, and they are used for image registration, horizontal resolution, color bar, 4:3 safe area, and so on. The 3D content is located entirely within the center rectangle 105 and consists of a left bull's-eye 110, a right bull's-eye 115, a vertical pole 120, a cube labeled "3D" 125, a cube labeled "TV" 130, text labeled "Left-eye Open" 135, and text labeled "Right-eye Open" 140. The pole 120 has zero disparity at the bottom and negative disparity at the top, which gives the appearance that the top of the pole is projecting toward the viewer. The cube labeled "3D" 125 has negative disparity, and thus appears closer to the viewer than the normal view plane. The cube labeled "TV" 130 has positive disparity, and thus appears farther away from the viewer than the normal view plane. The "Left-eye Open" text 135 only appears in the left-eye image while the "Right-eye Open" text 140 only appears in the right-eye image. The text has no 3D effect, and is only used to differentiate the combined image to the viewer, who can close one eye to view the image designated for that eye. In the left bull's-eye 110, the outer ring is at the normal view plane, the inner ring appears farther away, and the sphere appears farther away still. In the right bull's-eye 115, the outer ring is at the normal view plane, the inner ring appears closer, and the sphere appears closer still. FIG. 1 is depicted in the Drawings as a black in white image, but when displayed on a video waveform monitor, the image is depicted in color.

The sample cursor 145 (also referred to as a "pixel cursor") is depicted as a solid cross-hair and corresponds to the text labeled "S" in the disparity cursor readout 155. The sample cursor 145 allows a user to identify a particular sample (or pixel) of an image for analysis on the video waveform monitor.

The disparity cursor 150 is depicted as a dashed vertical line, and corresponds to the text labeled "Di" in the disparity cursor readout 155.

In operation, the user specifies a particular pixel of the left-eye image by placing the sample cursor 145 on the edge of an object in the left-eye view. The user then specifies a particular pixel of the right-eye image by placing the disparity cursor 150 on the same or corresponding edge of the object, but in the right-eye view. (Alternatively, the sample cursor 145 may be used to specify a particular pixel of the right-eye image, and the disparity cursor 150 may be used to specify a particular pixel of the left-eye image.) The disparity cursor readout 155 then provides a measured disparity value based on the specified pixels. For example, in some embodiments, the disparity cursor readout 155 displays the number of pixels, either positive or negative, relative to the sample cursor 145. In other embodiments, the disparity cursor readout 155 displays the measured object disparity in percent of the video horizontal resolution width. For example, in FIG. 1, the disparity cursor readout 155 reads "Disparity cursors −5.93% of screen width". This is an automatic calculation based on pixel difference and the horizontal resolution of the video format known by the video waveform monitor.

In some embodiments, the disparity cursor 150 tracks the movement of the sample cursor 145. That is, when the user moves the sample cursor 145, the disparity cursor 150 is automatically moved in the same manner. Thus, the disparity measurement is kept constant, and the measurement of a second object can be done quickly by adjusting the location of the sample cursor 145. In this manner, several like objects can be measured quickly and compared as to the expected depth.

Figure 2:
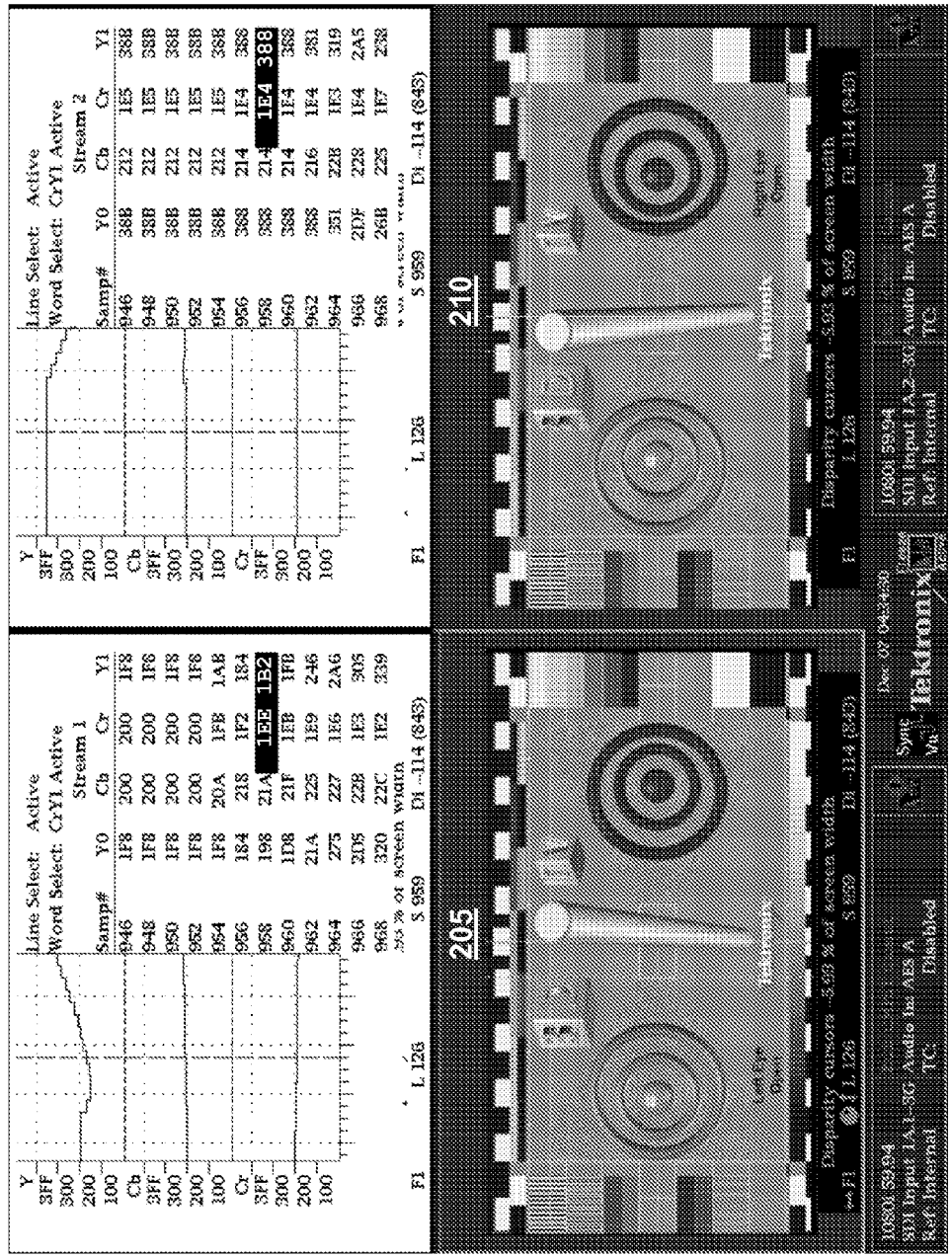
FIG. 2 depicts a display of a video waveform monitor according to a second embodiment of the present invention.

It will be appreciated that the present invention is not limited to the embodiment shown in FIG. 1. For example, in another embodiment shown in FIG. 2, the left image 205 and the right image 210 may be shown and analyzed separately. This is particularly useful in the case in which two separate video feeds are provided from two separate cameras, as is commonly the case in 3D production. In other embodiments, a disparity cursor is used on video signal waveforms such as RGB, YCbCr, and XYZ waveform traces in either parade or overlay modes. In other embodiments, a disparity cursor can be used with other composite images such as anaglyph or difference images, such as "left minus right". In other embodiments, a disparity cursor may be used to determine vertical disparity.

Although the sample cursor 145 is depicted as a solid cross-hair and the disparity cursor 150 is depicted as a dashed line, it will be appreciated that these depictions are only meant to be illustrative, and that a sample cursor and a disparity cursor may alternatively be depicted using any combination of solid, dashed, dotted, or colored lines, cross-hairs, circles, dots, mouse-pointers, or any other cursor capable of indicating an edge of an object in a video.

The display of a video waveform monitor "decimates" the image under test so that it can be shown on a small display. This can produce an error when trying to measure disparity. In order to avoid this error, in some embodiments (not shown), the sample cursor and the disparity cursor are shown together with a full high-definition (HD) display of the image under test on an external monitor that is connected to the video waveform monitor. The user can use this external display to make finer cursor adjustments, and thus, more accurate disparity measurements.

It will be appreciated from the foregoing discussion that the present invention represents a significant advance in the field of video test and measurement instruments. Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A test and measurement instrument comprising:
    a sample cursor that identifies a pixel of a first image;
    a disparity cursor that identifies a pixel of a second image;
    a measured disparity value based on the pixel of the first image and the pixel of the second image; and
    a disparity cursor readout that displays the measured disparity value.

2. The test and measurement instrument of claim 1 wherein the disparity cursor tracks the movement of the sample cursor.

3. The test and measurement instrument of claim 1 wherein the first image and the second image are displayed as a composite image.

4. The test and measurement instrument of claim 1 wherein the first image and the second image are displayed as two separate images.

5. The test and measurement instrument of claim 1, wherein the format of the disparity cursor readout is displayed as either a positive or negative pixel value.

6. The test and measurement instrument of claim 1, wherein the format of the disparity cursor readout is displayed as a percentage of the video horizontal resolution width.

7. The test and measurement instrument of claim 1, wherein a location of the sample cursor is automatically tracked by the disparity cursor.

8. A method of measuring disparity in a test and measurement instrument, comprising the steps of:
    identifying a pixel of a first image using a sample cursor;
    identifying a pixel of a second image using a disparity cursor; and
    calculating in a processor a measured disparity value based on the pixel of the first image and the pixel of the second image; and
    displaying the measured disparity value on a disparity cursor readout.

9. The method of claim 8 wherein the disparity cursor tracks the movement of the sample cursor.

10. The method of claim 8 wherein the first image and the second image are displayed as a composite image.

11. The method of claim 8 wherein the first image and the second image are displayed as two separate images.

12. The method of claim 8, wherein the format of the disparity cursor readout is displayed as either a positive or negative pixel value.

13. The method of claim 8, wherein the format of the disparity cursor readout is displayed as a percentage of the video horizontal resolution width.

14. The method of claim 8, further including automatically tracking the location of the sample cursor with the disparity cursor.

* * * * *